United States Patent
Kim et al.

(10) Patent No.: US 9,763,184 B2
(45) Date of Patent: Sep. 12, 2017

(54) METHOD FOR SUPPORTING SELF-ORGANIZATION NETWORK BASED ON DELAUNAY TRIANGULATION AND APPARATUS FOR SAME

(71) Applicants: LG ELECTRONICS INC., Seoul (KR); SOGANG UNIVERSITY RESEARCH FOUNDATION, Seoul (KR)

(72) Inventors: Youngtae Kim, Anyang-si (KR); Hongseok Kim, Seoul (KR); Gilsoo Lee, Seoul (KR)

(73) Assignees: LG Electronics Inc., Seoul (KR); Sogang University Research Foundation, Seoul (KR)

( * ) Notice: Subject to any disclaimer, the term of this patent is extended or adjusted under 35 U.S.C. 154(b) by 8 days.

(21) Appl. No.: 14/774,539

(22) PCT Filed: Nov. 11, 2013

(86) PCT No.: PCT/KR2013/010159
§ 371 (c)(1),
(2) Date: Sep. 10, 2015

(87) PCT Pub. No.: WO2014/142416
PCT Pub. Date: Sep. 18, 2014

(65) Prior Publication Data
US 2016/0029305 A1    Jan. 28, 2016

Related U.S. Application Data

(60) Provisional application No. 61/775,708, filed on Mar. 11, 2013.

(51) Int. Cl.
H04W 4/06         (2009.01)
H04W 52/02        (2009.01)
(Continued)

(52) U.S. Cl.
CPC ......... H04W 52/0206 (2013.01); H04W 4/06 (2013.01); H04W 24/02 (2013.01);
(Continued)

(58) Field of Classification Search
None
See application file for complete search history.

(56) References Cited

U.S. PATENT DOCUMENTS

2006/0223523 A1   10/2006   Houllier et al.
2010/0151882 A1    6/2010   Gillies et al.

FOREIGN PATENT DOCUMENTS

DE    WO 2011120554 A1 *  10/2011   ........ H04W 52/0206
KR    10-2011-0005558 A    1/2011

* cited by examiner

*Primary Examiner* — Kouroush Mohebbi
(74) *Attorney, Agent, or Firm* — Birch, Stewart, Kolasch & Birch, LLP

(57) ABSTRACT

The present invention relates to a method for supporting a self-organization network and an apparatus for the same. Particularly, the method comprises the steps of: transmitting, by a first base station, a broadcasting message including a utilization of the first base station; comparing, by a second base station, the operation rate of the first base station and the operation rate of the second base station using the broadcasting message; and performing, by the second base station, turn-off if the operation rate of the second base station is lower than the operation rate of the first base station, wherein the first base station and the second base station form a cluster by means of Delaunay triangulation.

10 Claims, 11 Drawing Sheets

(51) Int. Cl.
*H04W 24/02* (2009.01)
*H04W 72/04* (2009.01)
*H04W 88/08* (2009.01)
(52) U.S. Cl.
CPC ..... *H04W 72/048* (2013.01); *H04W 72/0473*
(2013.01); *H04W 88/08* (2013.01); *Y02B 60/50*
(2013.01)

| Greedy off algorithm ( GOFF ) |
|---|
| 1: Initialize $B_{on} = B$ |
| 2: while $B_{on} \neq \emptyset$ |
| 3:    Calculete $M_{GOFF}(i) = \dfrac{G(B_{on}\{i\}) - G(B_{on})}{q_i P_i}$, $\forall i \in B_{on}$ |
| 4:    $i^* = \arg\min_{i \in B_{on}} M_{GOFF}(i)$ |
| 5:    if $M_{GON}(i^*) < \eta$, then $B_{on} \leftarrow B_{on} - \{i^*\}$, |
| 6:    else, stop the algorithm. |
| 7:    end while |

- base station
- Edge
- - - - circumcircle

FIG. 5
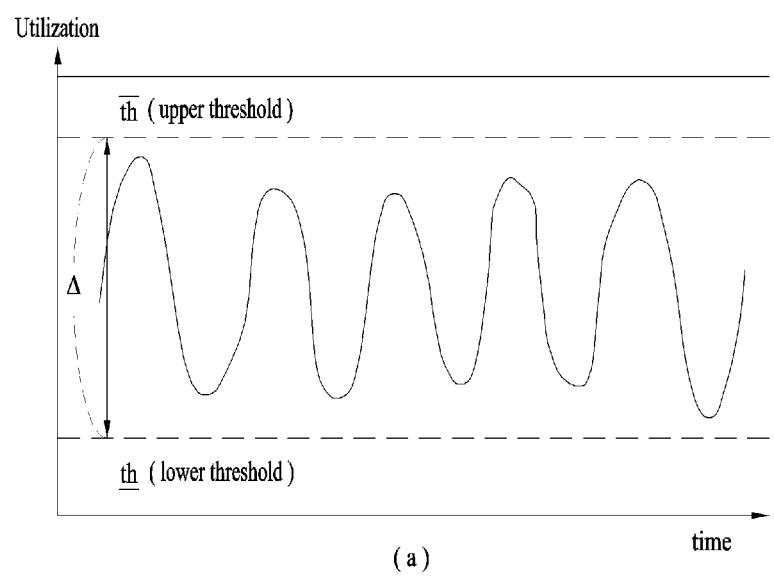
(a)
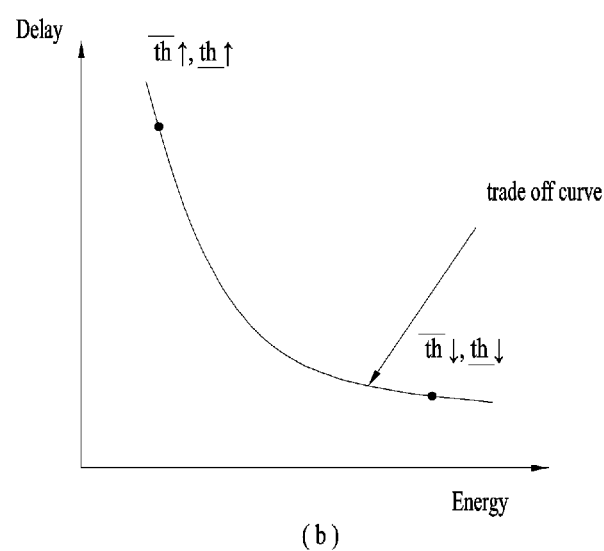
(b)

● base station that needs assistance as its utilization is increased

▨ base stations on DT comprised of turned off base stations

FIG. 10
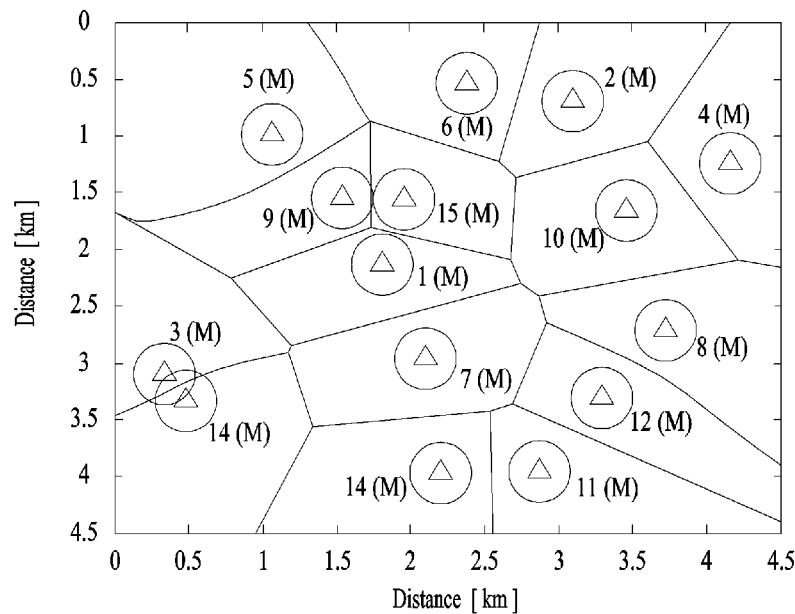
(a)
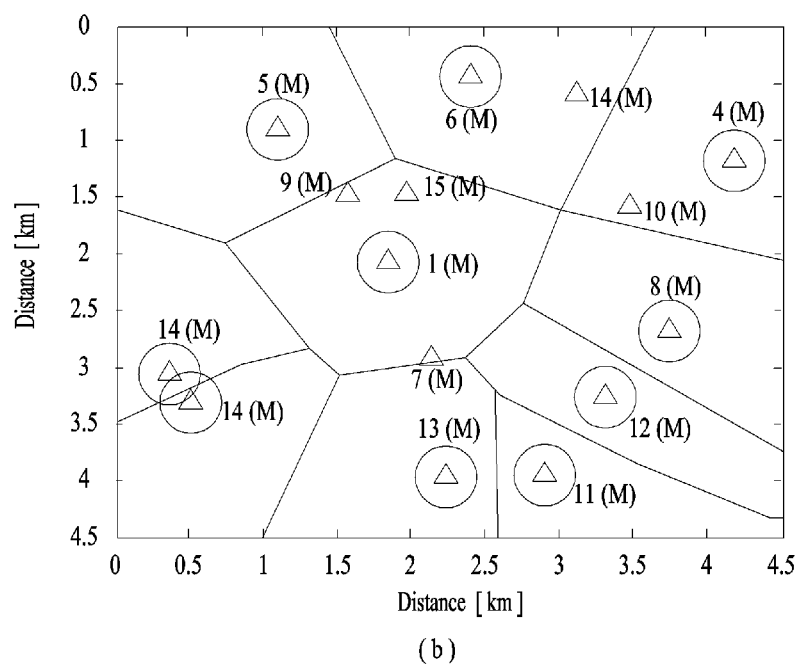
(b)

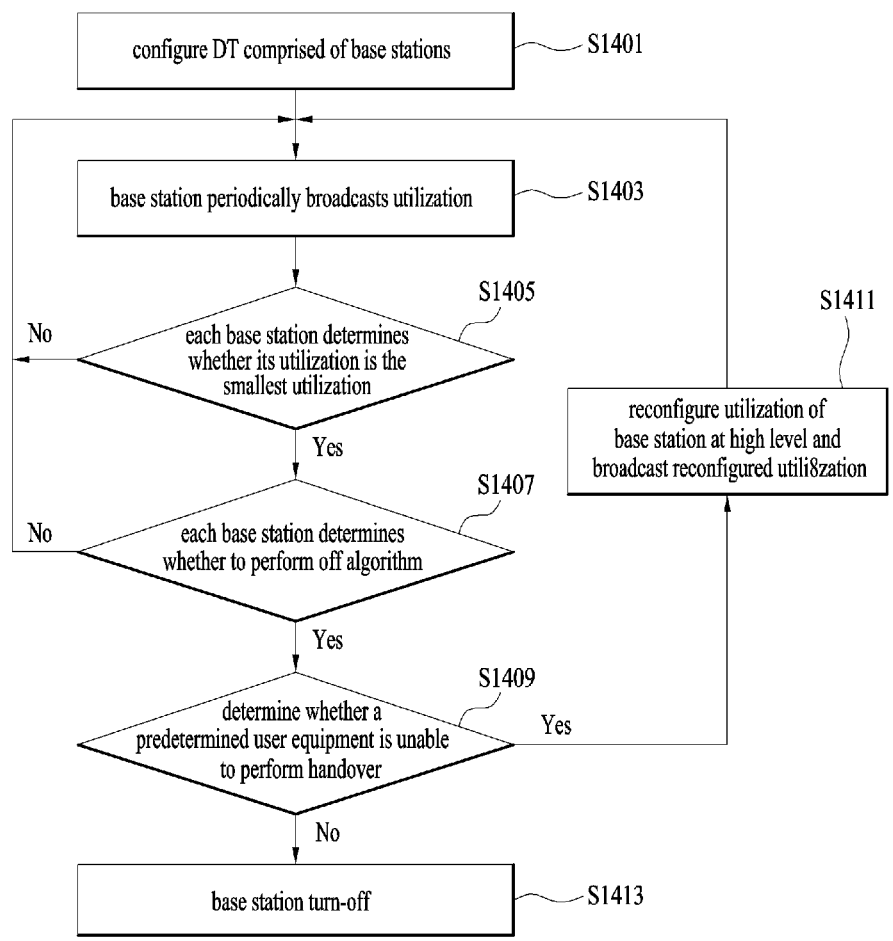

METHOD FOR SUPPORTING SELF-ORGANIZATION NETWORK BASED ON DELAUNAY TRIANGULATION AND APPARATUS FOR SAME

CROSS REFERENCE TO RELATED APPLICATIONS

This application is the National Phase of PCT/KR2013/010159 filed on Nov. 11, 2013, which claims priority under 35 U.S.C. 119(e) to U.S. Provisional Application No. 61/775,708 filed on Mar. 11, 2013, all of which are hereby expressly incorporated by reference into the present application.

TECHNICAL FIELD

The present invention relates to wireless communication system, and more particularly, to a method for supporting a self organization network (SON) for next generation to increase energy efficiency and an apparatus for the same.

BACKGROUND ART

A Green SON (Self Organizing Network) (hereinafter, referred to as green base station) which is a next generation self organization green wireless mobile communication network has been discussed in the current 3GPP LTE standard as an important issue. Technologies for achieving green radio resource management and operative goal of environment-friendly green base station based on new principles of green base station related current issues have been raised.

Upon review of various technologies for green wireless mobile communication networks which have been recently suggested, a 'cell zooming' scheme has been suggested in a paper of "cell zooming for cost-efficient green cellular networks," (Z. Niu, Y. Wu, J. Gong, and Z. Yang, IEEE Commun. Mag., vol. 48, no. 11, pp. 74-79, November 2010) to prevent a coverage hole that may be generated when a base station is turned on/off in a voice call environment.

Also, a method for turning on and off a base station in accordance with a load status of the base station has been suggested in "Base station operation and user association mechanisms for energy-delay tradeoffs in green cellular networks," (K. Son, H. Kim, Y. Yi, and B. Krishnamachari, IEEE Journal on Selected Areas in Communications, vol. 29, no. 8, pp. 1525-1536, September 2011). Particularly, a cost minimization problem has been solved by considering both user association based on load balancing and an issue related to energy efficiency improvement through base station on/off, and simple greedy-on (GON) and greedy-off (GOFF) algorithm has been suggested as the base station on/off method. The GON (GOFF) algorithm is a method for selecting a base station BS that has the greatest effect on the network or a BS that has the smallest effect on the network when the BSs are turned on (off) and turning on (off) the selected BS, and is a centralized procedure. FIG. 1 illustrates an example of the Greedy OFF (GOFF) algorithm.

The operative technology of a green base station is preferably performed based on the SON scheme. A next generation wireless mobile communication network is being evolved to a heterogeneous network (HetNet) where a small cell, a macro cell and a femto cell, which may be installed directly by a user, coexist as a cell size is subdivided. Complexity of the network has been increased remarkably due to transmission powers of various sizes, coverage, a femto cell that may be installed randomly, etc. Therefore, the SON network, which enables self configuration, self optimization, self healing, etc. as a type of a distributed system that may be operated in association with or independently from a centralized scheme applied to a legacy macro cell, has been actively discussed in the LTE standard.

In this respect, the centralized radio access network (C-RAN) and the SON have contrary features such as a centralized system and a distributed system but may be developed as being complementary to each other in a heterogeneous network environment, whereby studies of managing small cells such as RRH and femto cells in accordance with the SON scheme in association with the C-RAN scheme have been made.

Referring to energy consumption of network elements to increase energy efficiency of a mobile communication network, energy of 78% to 80% of an entire energy is consumed by a base station among a server, the base station and a user equipment. In view of energy consumption by the base station, 50% to 80% of power consumption of the base station is basically used for power supply, cooling, and monitoring. This may mean that energy consumed by the base station is fixed energy consumed regardless of the amount of traffic processed by the base station, and that energy consumption corresponding to the significant amount may be reduced by turning off the base station.

Moreover, it is required to identify traffic features of the current wireless mobile communication network to turn off the base station. Traffic has dynamic features statistically. A utilization of the base station is varied at a daily cycle, and fluctuates from maximum 95% to minimum 5% or less based on a peak value. In particular, the time when the utilization of the base station is reduced to 10% or less of the peak value corresponds to 30% to 40% of the entire time. Also, coverage of the base station is overlapped in a downtown area, which may be another factor that could lead to a low utilization of the base station. Based on temporal imbalance and spatial imbalance, energy efficiency may be maximized by turning off the power of the base station when the utilization of the base station is low.

DISCLOSURE

Technical Problem

An object of the present invention devised to solve the conventional problem is to provide a technology for achieving radio resource management and operative goal of environment-friendly green base station based on a distributed algorithm that may determine an on/off operation (sleeping operation) of a base station related to a green base station in accordance with an SON scheme.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned technical problems, according to one aspect of the present invention, a method for controlling a power in a wireless communication network comprises the steps of enabling a first base station to transmit a broadcasting message including a utilization of the first base station; enabling a second base station to compare its utilization with the utilization of the first base station by using the broadcasting message; and enabling the second base station to perform a turn-off operation if the utilization of the second base station is lower than the utilization of the first base station, wherein the first base station and the second base station form a cluster by means of Delaunay triangulation.

Moreover, the broadcasting message may be transmitted periodically.

Moreover, the second base station may be located within a predetermined hop from the first base station.

Moreover, the step of performing a turn-off operation may includes the steps of starting a turn-off algorithm if the utilization of the first base station is not higher than a predetermined threshold; and transmitting a turn-off announcement message to the first base station.

Moreover, the step of performing a turn-off operation is performed to sequentially reduce a power level of the second base station.

Moreover, the method further comprises the step of enabling the second base station to increase its utilization, broadcast the increased utilization and reconfigure its power level to a power level prior to the turn-off operation if a user equipment UE connected with the second base station fails to perform handover.

Moreover, the method further comprises the step of enabling the second base station to transmit a turn-off message to at least one user equipment connected with the second base station, wherein the at least one user equipment that has received the turn-off message is configured to set a timer for handover on the basis of a distance with the second base station. Moreover, the method further comprises the step of enabling the second base station to increase its utilization, broadcast the increased utilization and reconfigure its power level to a power level prior to the turn-off operation if the at least one user equipment fails to perform handover.

Moreover, the method further comprises the step of transmitting a turn-on message to a third base station if the first base station has a threshold higher than a predetermined upper threshold.

To solve the aforementioned technical problems, according to another aspect of the present invention, a first base station for performing power control in a wireless communication system comprises a radio frequency (RF) unit; and a processor, wherein the processor is configured to receive a broadcasting message including a utilization of a second base station from the second base station, compare a utilization of the first base station with the utilization of the second base station by using the received broadcasting message, and perform a turn-off operation if the utilization of the second base station is lower than the utilization of the first base station, and the first base station and the second base station form a cluster by means of Delaunay triangulation.

Advantageous Effects

According to the present invention, a method for performing radio resource management related to a green base station is provided. According to the embodiment of the present invention, a coverage hole of a cell may be prevented from being generated.

Also, in accordance with the present invention, performance deterioration of the SON may be minimized, and a call drop probability may be minimized.

Moreover, according to the present invention, an ON/OFF operation of a base station may be minimized and at the same time handover of a user equipment due to the ON/OFF operation of the base station may be managed.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a reference diagram illustrating an embodiment that an upper/lower threshold value is used in the present invention;

FIG. 10 is a diagram illustrating user association for coverage for serving user equipments in a base station in accordance with the embodiment of the present invention;

FIG. 14 is a reference diagram illustrating that an off operation is failed in a timer based handover.

BEST MODE FOR CARRYING OUT THE INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, the following detailed description is given under the assumption that 3GPP LTE mobile communication systems are used. However, the description may be applied to any other mobile communication system except for specific features inherent to the 3GPP LTE systems.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Moreover, in the following description, it is assumed that a terminal refers to a mobile or fixed type user equipment such as a user equipment (UE), and an advanced mobile station (AMS). Also, it is assumed that a base station refers to a random node of a network terminal, such as Node B, eNode B, and an access point (AP), which performs communication with the user equipment.

In a mobile communication system, a user equipment may receive information from a base station through a downlink and transmit information to the base station through an uplink. The information that the user equipment transmits or receives includes data and various types of control information. There are various physical channels according to the types and usages of information that the user equipment transmits or receives.

A 3GPP LTE (3rd Generation Partnership Project Long Term Evolution) (hereinafter, referred to as LTE) and LTE-Advanced (hereinafter, referred to as LTE-A) communication systems will be described as exemplary mobile communication systems to which the present invention may be applied.

Figures 1, 2:
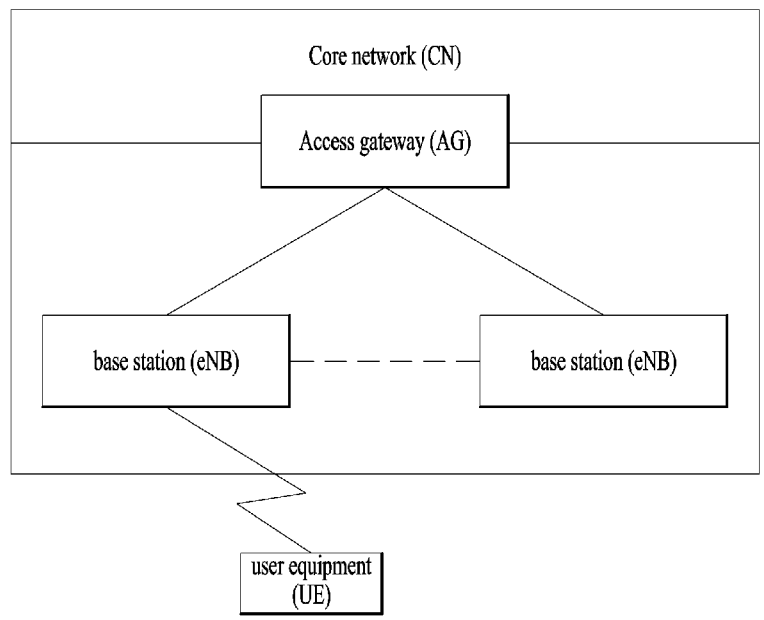
FIG. 1 is a diagram illustrating an example of a Greedy OFF (GOFF) procedure.
FIG. 2 is a network structure of an Evolved Universal Mobile Telecommunications System (E-UMTS) which is an example of a wireless communication system.

FIG. 2 is a diagram schematically illustrating a network structure of an E-UMTS as an exemplary radio communication system.

An evolved universal mobile telecommunications system (E-UMTS) is an advanced version of a legacy universal mobile telecommunications system (UMTS) and basic standardization thereof is currently underway in the 3GPP. E-UMTS may be referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 2, E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink (DL) or uplink (UL) transmission service to multiple UEs. Different cells may be configured to provide different bandwidths. The eNB controls data transmission and reception to and from a plurality of UEs. Regarding DL data, the eNB transmits DL scheduling information to notify a corresponding UE of a time/frequency domain within which data is to be transmitted, coding, data size, and hybrid automatic repeat and request (HARQ)-related information.

In addition, regarding UL data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of the UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, simplified structure, open interface, appropriate power consumption of a UE, etc. are required.

Recently, 3GPP has standardized technology subsequent to LTE. In this specification, the technology will be referred to as "LTE-Advanced" or "LTE-A". A main difference between the LTE system and the LTE-A system is a system bandwidth. The LTE-A system aims to support a wideband of up to 100 MHz. To achieve this, the LTE-A system employs carrier aggregation or bandwidth aggregation that accomplishes a wideband using a plurality of frequency blocks. Carrier aggregation uses a plurality of frequency blocks as a large logical frequency band in order to achieve a wider frequency band. The bandwidth of each frequency block can be defined on the basis of a system block bandwidth used in the LTE system. Each frequency block is transmitted using a component carrier.

Figure 3:
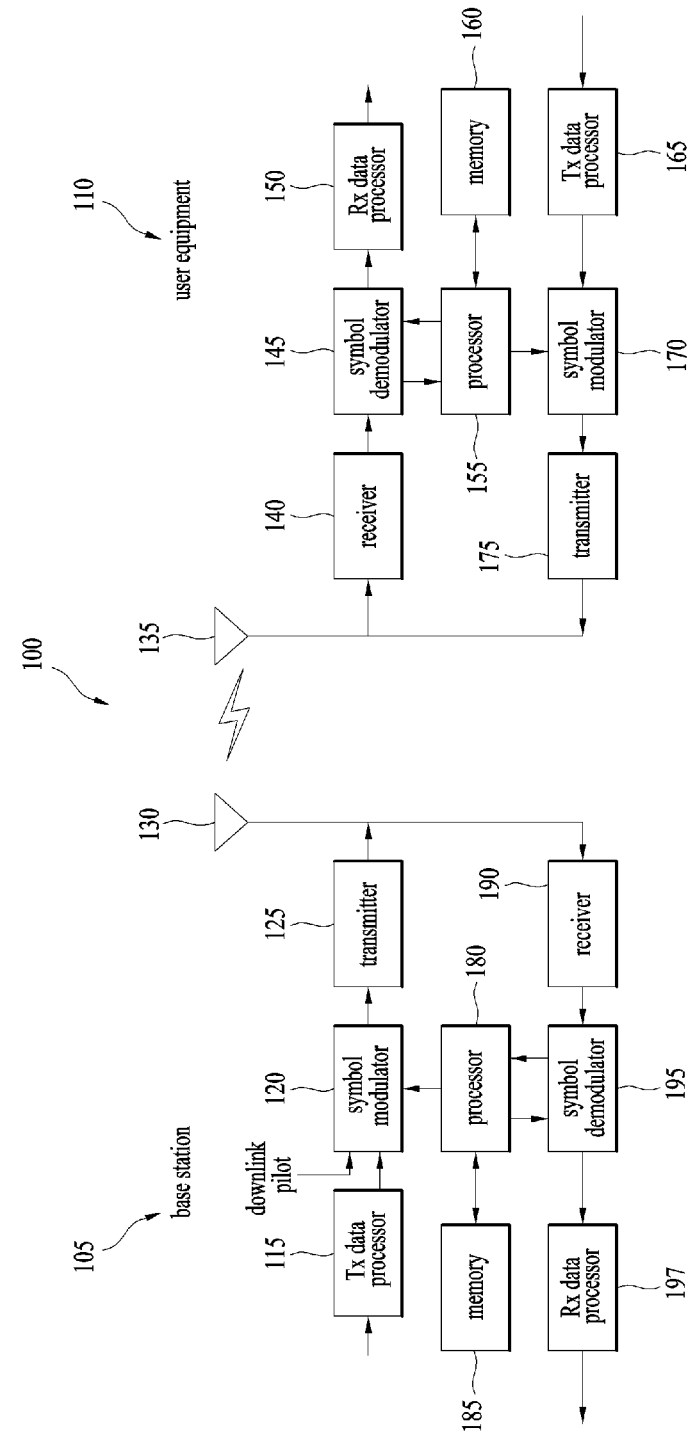
FIG. 3 is a block diagram illustrating configurations of a base station 105 and a user equipment 110 in a wireless communication system 100 according to the present invention.

FIG. 3 is a block diagram illustrating configurations of an eNB 105 and a UE 110 in a wireless communication system 100 according to the present invention.

While one eNB 105 and one UE 110 are shown in FIG. 3 to simplify the configuration of the wireless communication system 100, the wireless communication system 100 may obviously include one or more eNBs and/or one or more UEs.

Referring to FIG. 3, the eNB 105 may include a transmission (Tx) data processor 115, a symbol modulator 120, a transmitter 125, a Tx/Rx antenna 130, a processor 180, a memory 185, a receiver 190, a symbol demodulator 195, and an Rx data processor 197. The UE 110 may include a Tx data processor 165, a symbol modulator 170, a transmitter 175, a Tx/Rx antenna 135, a processor 155, a memory 160, a receiver 140, a symbol demodulator 145, and an Rx data processor 150. While the antennas 130 and 135 are each shown as a single antenna in the eNB 105 and the UE 110, the eNB 105 and the UE 110 include multiple antennas. Hence, the eNB 105 and the UE 110 according to the present invention support MIMO (Multiple Input Multiple Output) system. Furthermore, the eNB 105 and the UE 110 according to the present invention may support both single user-MIMO (SU-MIMO) system and multi-user-MIMO (MU-MIMO) system.

On the downlink, the Tx data processor 115 receives traffic data, processes the received traffic data through formatting, coding, interleaving, and modulation (or symbol mapping), and thus outputs modulated symbols ("data symbols"). The symbol modulator 120 processes the data symbols received from the Tx data processor 115 and pilot symbols, thus providing streams of the symbols.

More specifically, the symbol modulator 120 multiplexes the data symbols and the pilot symbols and transmits the multiplexed symbols to the transmitter 125. Each transmission symbol may be a data symbol, a pilot symbol or a zero signal value. Pilot symbols may be transmitted successively during each symbol period. The pilot symbols may be frequency division multiplexing (FDM) symbols, orthogonal frequency division multiplexing (OFDM) symbols, time division multiplexing (TDM) symbols, or code division multiplexing (CDM) symbols.

The transmitter 125 converts the symbol streams into one or more analog signals and generates a downlink signal suitable for transmission on a radio channel by additionally processing the analog signals (e.g. amplification, filtering, and frequency upconversion). The downlink signal is transmitted to the UE 110 through the antenna 130.

The UE 110 receives the downlink signal from the eNB 105 through the antenna 135 and provides the received downlink signal to the receiver 140. The receiver 140 processes the downlink signal, for example, through filtering, amplification and frequency downconversion and converts the processed downlink signal into digital samples. The symbol demodulator 145 demodulates received pilot symbols and outputs the demodulated pilot symbols to the processor 155 for use in channel estimation.

Also, the symbol demodulator 145 receives a frequency response estimate with respect to the downlink from the processor 155, acquires data symbol estimates (i.e. estimates of the transmitted data symbols) by demodulating the received data symbols using the frequency response estimate and provides the data symbol estimates to the Rx data processor 150. The Rx data processor 150 demodulates the data symbol estimates (i.e. performs symbol demapping), deinterleaves the demodulated data symbols, and decodes the deinterleaved data symbols, thereby recovering the traffic data transmitted by the eNB 105.

The operations of the symbol demodulator 145 and the Rx data processor 150 are complementary to the operations of the symbol modulator 120 and the Tx data processor 115 of the eNB 105.

On the uplink, the Tx data processor 165 of the UE 110 outputs data symbols by processing received traffic data. The symbol modulator 170 multiplexes the data symbols received from the Tx data processor 165 with pilot symbols, modulates the multiplexed symbols, and outputs a stream of the symbols to the transmitter 175. The transmitter 175 generates an uplink signal by processing the symbol stream and transmits the uplink signal to the eNB 105 through the antenna 135.

The eNB 105 receives the uplink signal from the UE 110 through the antenna 130. In the eNB BS 105, the receiver 190 acquires digital samples by processing the uplink signal. The symbol demodulator 195 provides uplink pilot symbol estimates and uplink data symbol estimates by processing the digital samples. The Rx data processor 197 processes the data symbol estimates, thereby recovering the traffic data transmitted by the UE 110.

The processors 155 and 180 command control, adjust and manage operations of the UE 110 and the eNB 105. The processors 155 and 180 may be connected respectively to the memories 160 and 185 that store program code and data. The memories 160 and 185 are connected to the processors 155 and 180 and store an operating system, applications, and general files.

The processors 155 and 180 may also be called controllers, microcontrollers, microprocessors, or microcomputers. The processors 155 and 180 may be configured in hardware, firmware, software, or a combination thereof. When embodiments of the present invention are implemented using hardware, application specific integrated circuits (ASICs), digital signal processors (DSPs), digital signal processing devices (DSPDs), programmable logic devices (PLDs), or field programmable gate arrays (FPGAs) which are adapted to implement the present invention may be included in the processors 155 and 180. When the embodiments of the present invention are implemented using firmware or software, the firmware or software may be configured to include a module, a procedure, a function, etc. which performs functions or operations according to the present invention. The firmware or software may be included in the processors 155 and 180, or stored in the memories 160 and 185 and invoked from the memories 160 and 185 by the processors 155 and 180.

The layers of radio interface protocols between a UE/BS and a wireless communication system (network) may be classified into a first layer, a second layer and a third layer (L1, L2 and L3) based on the three lowest layers of the open system interconnection (OSI) model. A physical layer corresponds to the first layer L1 and provides an information transmission service on physical channels. A radio resource control (RRC) layer corresponds to the third layer L3 and provides radio control resources between the UE and the network. The UE/eNB and the network exchange RRC messages through the RRC layer.

The term eNB used in the present invention may refer to a "cell or sector" when used as a regional concept. A serving eNB (or serving cell) may be regarded as an eNB which provides main services to UEs and may transmit and receive control information at a coordinated multiple transmission point. In this sense, the serving eNB (or serving cell) may be referred to as an anchor eNB (or anchor cell). Similarly, a neighbor eNB may be referred to as a neighbor cell used as a local concept.

Hereinafter, a method for managing radio resources, which may determine ON/OFF of an eNB in accordance with an SON scheme as suggested in the present invention, will be suggested based on the aforementioned description.

Although it is advantageous in that energy efficiency is high in accordance with application of the Green SON technology, Greening Cost may be generated, whereby trade off relation between energy efficiency and greening cost exists. Greening cost may be represented in the form of delay increase in the eNB and the UE, throughput deterioration, increase of call blocking, and occurrence of coverage hole.

Various control factors affect the greening cost. Examples of the various control factors in a normal wireless mobile communication network include transmission power control considering cell interference, etc., user scheduling considering utility and impartiality, user association for connecting a user with an eNB and load balancing, context aware eNB On/Off, and cell planning considering energy efficiency.

In case of assumption that a fixed number of users having a saturated queue in the legacy system that does not consider energy efficiency, simultaneous solving of utility maximization problem through transmission power control and scheduling is to obtain an optimized solution with a non-convex optimized problem and is very difficult. Also, transmission power control and user association are problems associated with load balancing, and when transmission power control and user association are regarded as factors to solve the problems, a problem which is not solved still exists.

Therefore, in the legacy green wireless mobile communication network, a fixed number of users which always have saturated queue are assumed in a state that features of traffic dynamically varied in temporal and spatial areas are not used well. Conventionally, this system is used for an invention of cross layer design in a PHY layer and a MAC layer.

However, in an environment of traffic dynamically varied in temporal and spatial areas, the number of users who receive services at the same time is varied every moment as a new flow or session is introduced in or excluded from the system. For efficiency analysis in a dynamic status that a flow with a probability distribution of a random size is introduced in the system and then excluded from the system after finishing a service, the present invention suggests a distributed algorithm for self organization optimization using flow level dynamics technology.

The flow level dynamics technology is based on a queuing theory. In the legacy communication network invention, it is generally assumed that a fixed number of users exist in the system and packets desired to be transmitted are stacked on a queue of each user. This case will be referred to as a saturated system or infinitely backlogged system.

However, throughput analysis in the saturated system is a method for observing a system by taking a snap shot of the system on a time axis, and is not appropriate to effectively observe a dynamic phenomenon actually generated in the network. For example, if a user downloads files by accessing a specific server of Internet, file transmission constitutes one flow which is a flow of packets, from the time when file transmission starts to the time when file transmission ends, and the corresponding eNB performs a scheduling procedure of allocating radio resources such as time, frequency and space to process the corresponding flow. If file transmission ends, the corresponding flow disappears from the system, and radio resources allocated to the eNB for transmission of the corresponding flow are subjected to callback. Therefore, for analysis proximate to the actual network environment, analysis in the dynamic network environment is necessarily required.

In the present invention, dynamics of temporal and spatial network traffic will be subjected to modeling as follows and then used as basic tools. Simply, an area L where a set B of all the base stations eNBs provides services may be regarded as $L \subset R^2$, wherein R means a radius of a specific base station. One point x in the area may be regarded as $x \in L$. Supposing that index i of the base station is $i \in B$, best effort traffic such as file transmission is arrived by a Poisson point process on a space, and supposing that a generation rate of a flow per unit time and per unit area is $x \in L$ and an average file size is $1/\mu(x)$, traffic load density which is bets/sect per unit area is defined as $$\gamma(x) := \frac{\lambda(x)}{\mu(x)}.$$

In this way, traffic generated at a specific point $x \in L$ should be processed by a specific base station, and supposing that channel capacity of a base station i, which is viewed from the specific point x, is $c_i(x) = w_i \log_2(1+SINR_i(x))$, the channel capacity is determined by a signal to interference noise ratio (SINR) and a spectrum width $w_i$ which is used. $c_i(x)$ is determined by position, and is a value obtained by reflecting shadowing as well as distance attenuation from the base station. The time required to process traffic generated per unit area by the base station i at a speed of $c_i(x)$ is defined as system load density $\rho_i(x)$ and is given by $$\rho_i(x) := \frac{\gamma(x)}{c_i(x)}.$$

If the system load density defined as above is subjected to integral by being multiplied by user association probability $p_i(x)$ connected to each base station in the spatial area, a BS utilization indicating how many radio resources should be allocated from the corresponding base station to process traffic generated in the corresponding area should have a value between 0 and 1 for system stability, and is defined as expressed by the following Equation 1.

$$\rho_i = \int_L \rho_i(x) p_i(x) dx \quad \text{[Equation 1]}$$

An objective function in the flow level dynamics will be described. The BS utilization $\rho_i$ is a core parameter statistically indicating dynamic features of the network, and is closely associated with flow level throughput of a user and energy consumption of the base station. If the number of flows activated in the network is varied dynamically, the flow connected to each base station is scheduled with temporally fair, an average file download time which is one of flow level throughputs in the base station i is expressed at the rate of $$\frac{\rho_i}{1-\rho_i}$$

by M/GI/1-Multi Class Processor Sharing model. An average power consumed amount of the base station may proximate to a primary function of the BS utilization $\rho_i$ in the form of $P_i = a((1-q)\rho_i + b)$. Supposing that a BS utilization vector is $\rho$, a user flow level throughput of a user, such as file download, is $\Phi(\rho)$, energy consumption of the base station is $\Psi(\rho)$, and a weight value for determining trade-off between flow level throughput and energy consumption is $\eta$, a general objective function is expressed as $\Phi(\rho) + \eta \Psi(\rho)$, and an optimization generally to be solved may use the Equation 2 as follows when the BS utilization vector $\rho$ is varied within a random valid set F by the user association probability $p_i(x)$.

$$\min_{\rho \in F} \Phi(\rho) + \Psi(\rho) \quad \text{[Equation 2]}$$

It should be noted that an optimization factor is given by $\rho$ but $p_i(x)$ actually becomes the optimization factor. The above problem becomes a convex optimization problem if the valid set F is a convex set and the objective function is a convex function, and a distributed algorithm for solving the problem exists. Therefore, the user equipment at each position has a user association algorithm for selecting a base station through trade-off between flow level throughput and energy efficiency, and the algorithm is converged on an optimized point if the algorithm is repeated. It should be noted that user association is defined by the probability $p_i(x)$ but optimized user association exists as a distributed algorithm called green α-optimal user association which is a deterministic system. Table 1 illustrates comparison between the green α-optimal user association and C-RAN.

TABLE 1

| Item | C-RAN | green α-optimal user association |
| --- | --- | --- |
| Summary | Central process based green load balancing between base stations | Distributed algorithm based green load balancing between base stations ions |
| Property | System implementation by communication equipment manufacturer | Optimal solution may be achieved by distributed algorithm |
| Advantage | Fast load balancing due to centralized process | Excellent extendibility due to distributed algorithm |
| Drawback | Probability of restrictions in extendibility due to increase of the number of users | Convergence time due to repeated process |

1. Threshold-Based Green Off Algorithm

The present invention suggests a green base station (BS) on/off method for managing base station topology based on a graph theory and turning on/off a base station in accordance with network traffic as an embodiment that a green SON base station is managed in a heterogeneous network (HetNet) environment.

Hereinafter, a method for configuring an overlay network between base stations physically connected to each other through an interface X2 by using a graph theory, a method for using Delaunay triangulation (DT) in configuring an overlay network, and a method for selecting a base station, which will perform an on/off operation, by configuring a threshold value will be described.

1-1. Method for Configuring an Overlay Network Between Base Stations Through a Graph Theory In the present invention, graph theory based self organization green base station management technology is suggested to implement self green SON management technology adaptive to a spatial traffic pattern. As a method for configuring an overlay network between base stations physically connected to each other, the followings may be considered using a graph theory.

For application of SON algorithm, it is required to transmit and receive message between the base stations, and it is required to explicitly configure a target for message transfer.

There is no base station central controller corresponding to RNC of 3G UMTS in the LTE system, and the respective base stations are connected to each other by the interface X2 and should cooperate with each other in accordance with the SON algorithm for inter-cell interference and cell load balancing, whereby a neighboring base station (neighboring cell) of each base station is required to be defined explicitly.

Since a set of base stations which are turned on is dynamically varied, each base station should know changed matters of a neighboring base station in accordance with the on/off operation. If an appropriate graph theory is used, each base station may trace a neighbor cell list (NCL) dynamically, whereby each base station may cooperate with its neighboring base station when determining the on/off operation.

A graph configured for each of base stations which are turned on, base stations which are turned off, or all the base stations is configured by an overlay network which exists on physical connection between the base stations, and two base stations may be neighboring base stations even though there is no physical connection between the two base stations and may cooperate with each other.

If there is any change in the graph due to base station on/off, each base station should be connected with a new neighboring base station through a mutual local operation. This will be operated by a distributed algorithm of self organization.

1-2. Method for Using Delaunay Triangulation (DT) in Configuring an Overlay Network Through a Graph Theory FIG. 4 illustrates an example that an SON type network between base stations is configured using a Delaunay Triangulation (DT) graph model.

Figure 4:
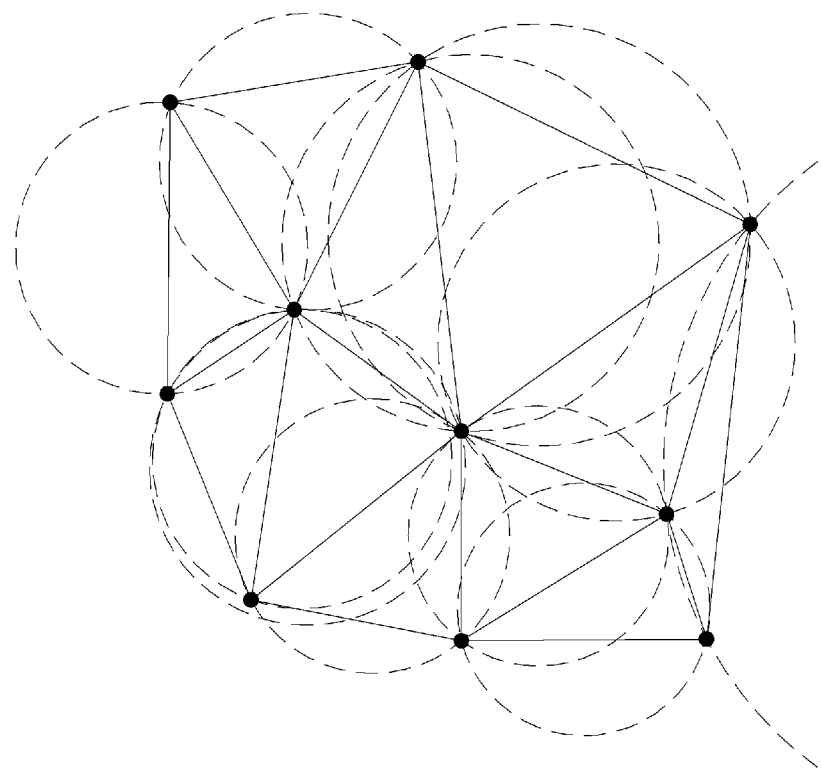
FIG. 4 is a diagram illustrating that an SON type network between base stations is configured using a Delaunay Triangulation (DT) graph model.

In FIG. 4, DT may be represented by a dual graph of a Voronoi diagram. That is, edges among cells adjacent to each cell of the Voronoi diagram are connected to one another to configure DT. Therefore, when a circumcircle connecting respective three points with one another is drawn, DT may be expressed by a triangle comprised of three points if the circumcircle does not include another point.

In the present invention, after DT is configured, a "cluster" may be defined. Although various methods for defining a cluster may exist, the core of the present invention is that the methods are based on a distributed algorithm. As a result, since it is important that the distributed algorithm is described based on a specific base station BS i, clustering based on the BS i is considered. Therefore, in the present invention, definition of the cluster may be varied depending on what the corresponding base station is.

In the present invention, a cluster of the base station BS i means one cluster defined to include a neighbor of n-hop of the base station BS i on DT comprised of entire base stations. Therefore, the BS utilization $\rho i$ is broadcast to reach the neighbor of the n-hop based on the BS i, and if a hop counter for reducing the broadcast message as much as 1 whenever 1 hop passes is used, broadcasting may be performed for all the base stations within the cluster and may not be spread any more. Therefore, each base station may be operated locally within the cluster without needing to know the status of all the base stations.

Also, if a DT graph is used, the DT graph is almost similar to a full mesh graph in a path length and hop count. Preferably, a size of memory tables for a neighboring base station, which should be owned by each base station (one node), is defined as an average 6. Therefore, since the number of neighboring base stations is restrictive, it is advantageous in that small signaling is required for message broadcasting between the base stations and signaling overhead is not great, whereby the DT graph is effective for SON scenario.

Therefore, in the present invention, three types of DT graphs exist to apply DT to a 'Utilization threshold-based Green BS ON/OFF Algorithm', and each base station updates its neighboring base station for each DT graph whenever there is any ON/OFF operation of the base station.

DT comprised of all the base stations within cluster (hereinafter, DT of all the base stations)

DT comprised of base stations turned on within cluster (hereinafter, DT of turned-on base stations)

DT comprised of base stations turned off within cluster (hereinafter, DT of turned-off base stations)

1-3. Utilization of Threshold-Based Green BS ON/OFF Algorithm

In the present invention, a Green BS ON/OFF method is performed using a base station BS utilization.

The utilization of the base station i is $$\rho_i = \int_L \rho_i(x) p_i(x) dx$$

as expressed in the Equation 1, and is represented by an integral type in a spatial area after traffic load density is multiplied by user association probability, whereby the BS utilization may indicate spatial traffic distribution information. Moreover, the BS utilization in the system such as LTE may be defined using an average utilization of a resource block managed by a scheduler. In the present invention, an upper threshold and a lower threshold are defined using the BS utilization to control the on/off operation.

First of all, the BS OFF algorithm suggested in the present invention will be described. In a state that traffic is varied in the form of sinusoidal wave on a space and time and utilization of the base stations is generally low, the base station of which utilization is lower than the lower threshold is turned off.

Also, each base station may determine whether it should be turned off, on the basis of the utilization information broadcast within the cluster. Therefore, if the base stations are turned off in the order of low utilization, too many base stations may be turned off. Alternatively, traffic is generally increased after a certain time period passes (for example, in case where morning comes after night passes), whereby utilization of the specific base station is increased and thus QoS may be deteriorated. In order to solve such a case, the upper threshold which is another type threshold may be configured, whereby the base station having utilization of the upper threshold or more may transmit a turn-on message to its neighboring base station which is turned off to turn on the neighboring base station.

FIG. 5 is a reference diagram illustrating an embodiment that an upper/lower threshold value is used in the present invention. As illustrated in FIG. 5(a), in the present invention, if a delta Δ value which is a difference between the lower threshold and the upper threshold is increased, ping-pong effect in which the base station repeats the on/off operation may be reduced. That is, a system operator (mobile operator) may configure network stability as needed by appropriately configuring the lower and upper thresholds. In this case, an effect that a desired operation point on a trade-off curve between energy consumption and delay is configured may be obtained as illustrated in FIG. 5(b).

Moreover, since the on/off operation of each base station is performed within the cluster according to DT, the on/off operation may be performed regardless of the size of the entire network. Furthermore, if topology of the base station is varied dynamically, the on/off operation of the base station may be affected by the topology of the base station, which is varied dynamically. Likewise, topology of the base station may be varied dynamically even depending on the on/off operation of the base station.

Figure 6:
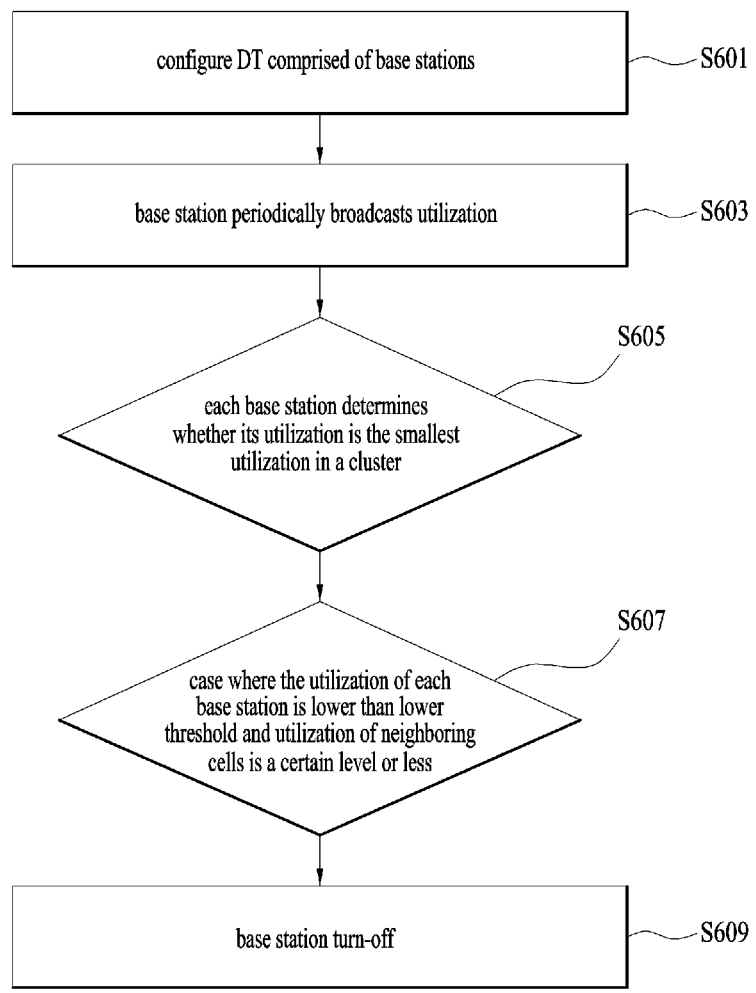
FIG. 6 is a reference diagram illustrating a method for performing threshold based Green BS off in accordance with one embodiment of the present invention.

FIG. 6 is a reference diagram illustrating a method for performing threshold based Green BS off in accordance with one embodiment of the present invention. In FIG. 6, the threshold based Green BS OFF method is based on the operation performed on the basis of 'DT comprised of base stations turned on within the cluster'. Also, in FIG. 6, the off operation of the base station is performed depending on the lower threshold. If the lower threshold is high, more base stations may be turned off, whereby energy efficiency may be improved. However, performance displayed as delay is lowered. Hereinafter, on the assumption of the aforementioned description, application of the off operation of the base station will be described.

First of all, DT is comprised of base stations turned on (S601).

At step S601, each base station constituting DT periodically broadcasts its utilization (S603).

As each base station transmits its utilization in accordance with a broadcast type, each base station may identify utilization of base stations existing within its n-hop, and may determine whether its utilization is the smallest within a cluster to which it belongs, as compared with the utilization of the base stations existing within its n-hop (S605).

If each base station determines that its utilization is the smallest within its cluster and a utilization of a neighboring base station is not too high (that is, if the utilization of the neighboring base station is another threshold or less), the corresponding base station starts to perform the off algorithm. In other words, if the neighboring base stations which will burden traffic of the base station which is turned off are too busy, it may adversely affect QoS. Therefore, considering the utilization of the neighboring base station, the off operation of the base station may be configured to be performed just in case that the neighboring base stations are not too busy (S607).

If the specific base station enters the off algorithm, the specific base station notifies another base station within n-hop of the off operation, and if the off operation is completed, the specific base station reports the completed off operation to another base station to configure new DT (S609).

2. Threshold-Based Green on Algorithm

The threshold-based Green BS ON Algorithm according to one embodiment of the present invention may be operated based on two graphs of 'DT comprised of all the base stations within a cluster' and 'DT comprised of base stations turned off within a cluster'.

Figure 7:
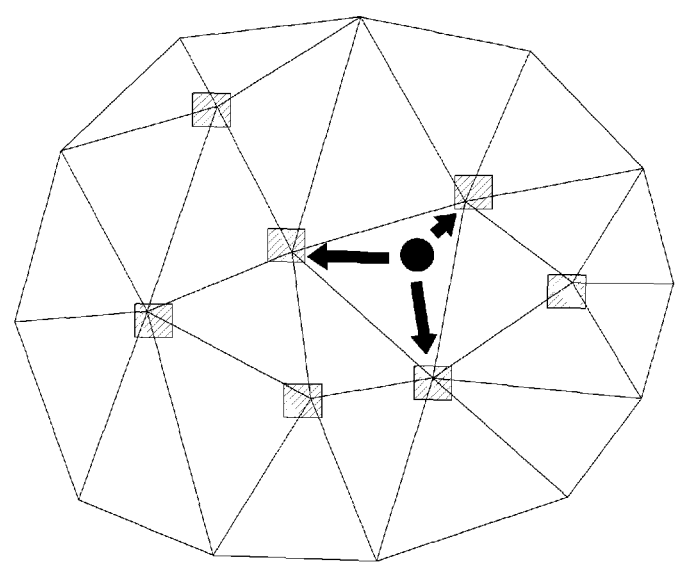
FIG. 7 is a diagram illustrating an On algorithm of a base station under the aforementioned assumption.

FIG. 7 is a diagram illustrating an On algorithm of a base station under the aforementioned assumption. Hereinafter, the on algorithm of the base station will be described.

If a base station $BS_i$ of which utilization is higher than the upper threshold exists (that is, $\rho_i \geq$ upper threshold), the on algorithm of the base station according to the present invention is performed.

The base station $BS_i$ broadcasts a turn-on message to base stations on DT comprised of all the base stations.

Among the base stations on 'DT comprised of base stations turned off', the base stations (that is, three base stations of triangle apexes) corresponding to triangle apexes in which the base station $BS_i$ is included, receive the turn-on message of the base station $BS_i$ which is broadcast. In this case, the turn-on message may include GPS position information of the base station $BS_i$ and utilization information of the base station $BS_i$. Also, since the base stations on DT comprised of turned-off base stations know what their neighboring base stations defined on the corresponding DT are and also know coordinates of their neighboring base stations through mutual exchange, three base stations of the triangle apexes may know that the base station $BS_i$ is included in the triangle of the three base stations.

Each of the three base stations of the triangle apexes calculates a distance with the base station $BS_i$ by using GPS information after receiving the turn-on message. Each of the three base stations of the triangle apexes exchanges distance information far away from the base station $BS_i$ with the other two base stations.

Among the three base stations, the base station farthest away from the base station $BS_i$ is automatically turned on in accordance with the exchanged distance information.

In the embodiment related to the Green BS on algorithm of the present invention, among three base stations of the triangle on the DT comprised of turned-off base stations, which surround a base station which needs assistance due to its high utilization, the turned-off base station farthest away from the base station which needs assistance is turned on. If the base station simply far away from the base station which needs assistance is turned on, it may not effective to distribute traffic to the base station which needs assistance when the turned-off base station is turned on. However, in the embodiment of the present invention, since three neighboring base stations on the DT comprised of turned-off base stations are operated by receiving the turn-on message, among three neighboring base stations of the turned-off base stations based on the base station $BS_i$, the base station farthest away from the base station $BS_i$ is turned on, whereby it is advantageous in that the base station of an appropriate distance, to which assistance may actually be given, is turned on.

Figure 8:
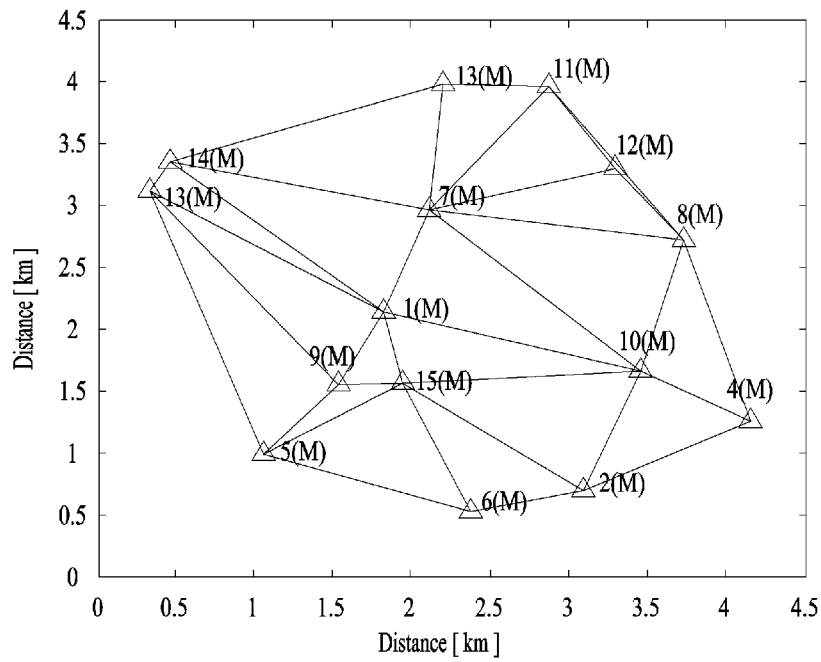
FIG. 8 is a reference diagram illustrating a threshold based Green BS off embodiment.

3. Performance According to the Embodiment Related to Threshold Based Green BS Off Algorithm FIG. 8 is a reference diagram illustrating a threshold based Green BS off embodiment. In FIG. 8, energy delay trade-off at different traffic levels under 15 virtual 3G base station environments of a downtown area will be described. This embodiment of the present invention is compared with the embodiment of Greedy Off (GOFF) algorithm. Parameters used to describe this embodiment are the same as those in the embodiment of the GOFF algorithm, and it is assumed that the base station has a transmission power of 43 dBm and consumes energy of 865 W in accordance with a relation between a transmission power and an operation power. A modified COST 231 path loss model is used as a propagation environment, and other parameters depend on IEEE 802.16m evaluation methodology document (EMD).

It is assumed that traffic generated in the user equipment is distributed homogeneously on a space and 15 base stations belong to the same cluster. A case where average utilizations of initial base stations are 15%, 30% and 45%, respectively, will be described. As compared with the actual status, 15% indicates that utilization at night time zone is very low, and 30% and 45% indicate that traffic is increased in the morning after night time zone passes. A power model consumed by the base station corresponds to a case where the base station on/off operation is most needed. That is, a power model has been used, in which a consumed power of the base station is determined by only on/off status of the base station. Of course, even if the power consumed by the base station is configured in proportion to the utilization, the same model may be used.

In the threshold based Green BS off embodiment of the present invention, an operation point is determined depending on the lower threshold. That is, it is assumed that operation is performed while the lower threshold is being increased from 0.01 to 0.80. (The upper threshold is set to 1 which is a maximum value.) If the lower threshold is increased, more base stations may be turned off. However, if too many base stations are turned off, a utilization of any one base station exceeds the upper threshold, whereby the off algorithm according to the embodiment of the present invention is stopped.

Figure 9:
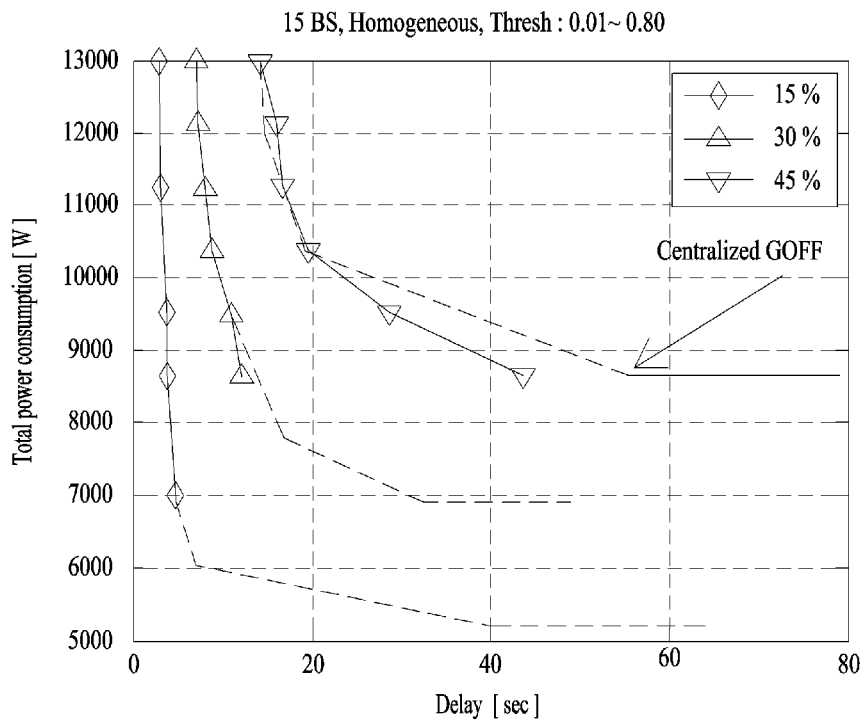
FIG. 9 is a diagram illustrating a relation among a lower threshold value, the number of base stations, and energy consumption according to the embodiment of the present invention.

FIG. 9 illustrates that energy consumption is reduced by increase of the number of base stations which are turned off as a value of the lower threshold is increased in accordance with the embodiment of the present invention. That is, referring to FIG. 9, in the GOFF algorithm which is a comparison target with the embodiment of the present invention, in a state that η (that is, weight value for determining trade-off between flow level performance and energy consumption) of the objective function is varied to minimize energy consumption, delay is greatly increased to deteriorate performance (that is, dotted graphs in FIG. 9). On the other hand, in the threshold based BS ON/OFF embodiment suggested in the present invention, since the value of the upper threshold is set, if performance measured by delay is more deteriorated than an appropriate range, the algorithm for turning off the base station may be stopped, whereby network stability may be maintained.

FIG. 10 is a diagram illustrating user association for coverage for serving user equipments in a base station in accordance with the embodiment of the present invention. As illustrated in FIG. 10, first 15 base stations are turned on (FIG. 10a), and if the threshold based Green BS off algorithm is operated, the operation for turning off five base stations is performed (FIG. 10b). It is assumed that parameters used in FIG. 10 are η=0, lower threshold=0.2, α (Alpha)=2, and initial average load is 15%.

4. Green Massive Handover

In the present invention, it is required to assure seamless connection between the base station and the user equipment to support a Green BS operation. That is, if the Green BS off algorithm is performed to turn off the base station BS, all the user equipments connected to the corresponding base station should perform handover to their neighboring base station, whereby the following problems should be considered.

Figure 11:
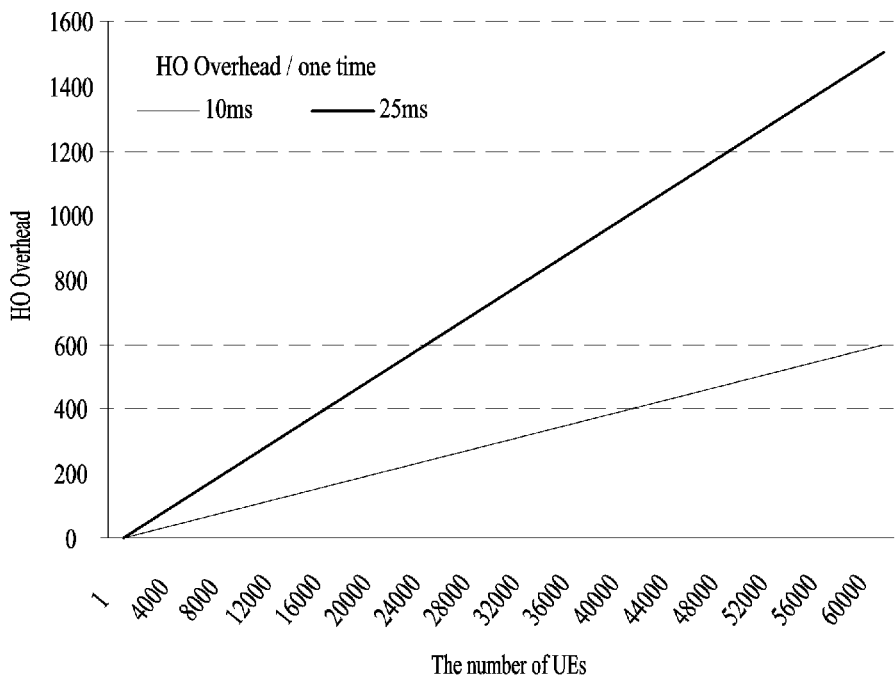
FIG. 11 is a diagram illustrating a total handover time when mass handovers are generated due to base station off.

All the user equipments connected to the corresponding base station should perform handover at the same time. Current handover is performed sporadically by a change of a channel status due to a movement of the user equipment, whereas green handover may cause a very large number of corresponding user equipments. FIG. 11 is a diagram illustrating a total handover time when mass handovers are generated due to base station off. That is, as illustrated in FIG. 11, 20 minutes or more may be required to turn on one base station when sequential handover is applied (in this case, a single provider, Seoul population density 17,289/km$^2$ are assumed regarding the number of user equipments connected to the base station within a radius of 1 km).

When sequential handover is performed, traffic load of neighboring base stations is high, whereby a problem may occur in that all the handover requests of the user equipments from the base stations which are powered off may not be accepted.

The present invention suggests i) a method for gradually reducing an antenna power level of a base station which will perform power-off (power dimming method) and ii) a method for determining the order of handover by using a timer.

4.1 Method for Gradually Reducing an Antenna Power Level of a Base Station which Will Perform Power-Off (Power Dimming Method)

The handover method suggested in the present invention may be performed in such a manner that user equipments easy to perform handover have priority (that is, best case first). Therefore, the user equipment may have an effect that the base station is far away from the user equipment by mobility (mobility-assisted handover, MAHO), and the legacy LTE handover standard may be applied to the user equipment. Also, a network operator may prevent simultaneous handover from being performed by controlling a speed for reducing antenna output, and a stable number of user equipments may perform sequential handover.

Figure 12:
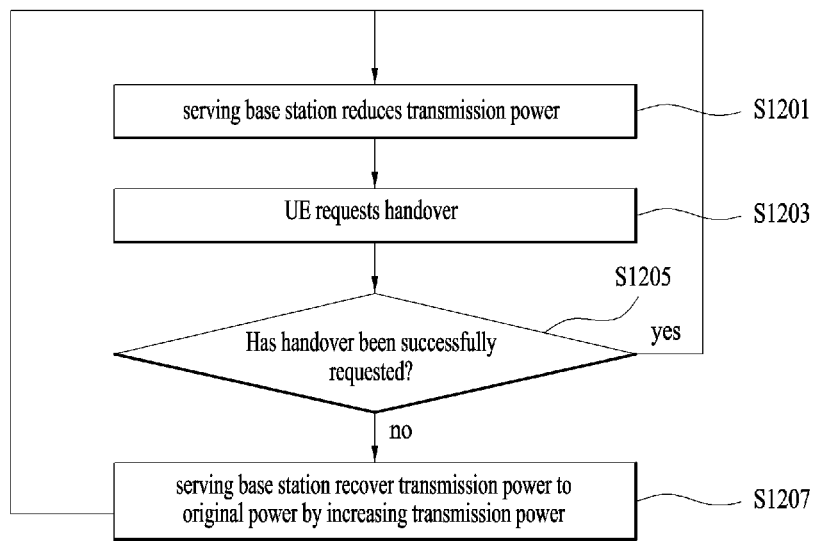
FIG. 12 is a diagram illustrating a method for gradually reducing an antenna power level of a base station, which is suggested in the present invention.

The method for gradually reducing an antenna power level of a base station as suggested in the present invention will be described with reference to FIG. 12.

A serving base station (eNB) reduces a transmission power (S1201).

At least one user equipment UE requests its neighboring base station of handover (HO) in accordance with the step S1201 (S1203).

The base station determines whether handover has been successfully performed (S1205), and if it is determined that handover has been successfully performed, the base station gradually reduces the antenna power level of the base station by again performing the step S1201.

However, if handover has not been successfully performed (S1205), the serving base station recovers the transmission power to a previous transmission power before the transmission power is reduced (that is, prior to the step S1201) and then performs the step S1201 again.

Also, neighboring base stations extends their cell coverage by increasing the transmission power (Tx power) to prevent a coverage hole from being generated, thereby supporting services of the user equipments. Additionally, for the method suggested in the present invention, a message field for negotiation between the serving base station BS and the neighboring base station BS may be configured.

4.2 Method for Determining the Order of Handover by Using a Timer

If the base station which will perform the off operation is determined by the aforementioned threshold based Green BS OFF algorithm in accordance with the present invention, the user equipment sets a timer value based on a distance with the base station which will be powered off, and performs handover if the timer expires.

That is, in the method for determining the order of handover by using a timer, a message indicating that the base station which will be powered off should be explicitly notified to the user equipments connected to the corresponding base station. The user equipments that have received the message set the value of the timer by means of a function of a distance, for example, allows the value of the timer to be increased in proportion to the square (time out interval $\propto r (x)^2$). In this case, supposing that the user equipments are uniformly distributed within coverage of the base station which will be powered off, the number of user equipments subjected to handover per unit time may exist uniformly.

Figure 13:
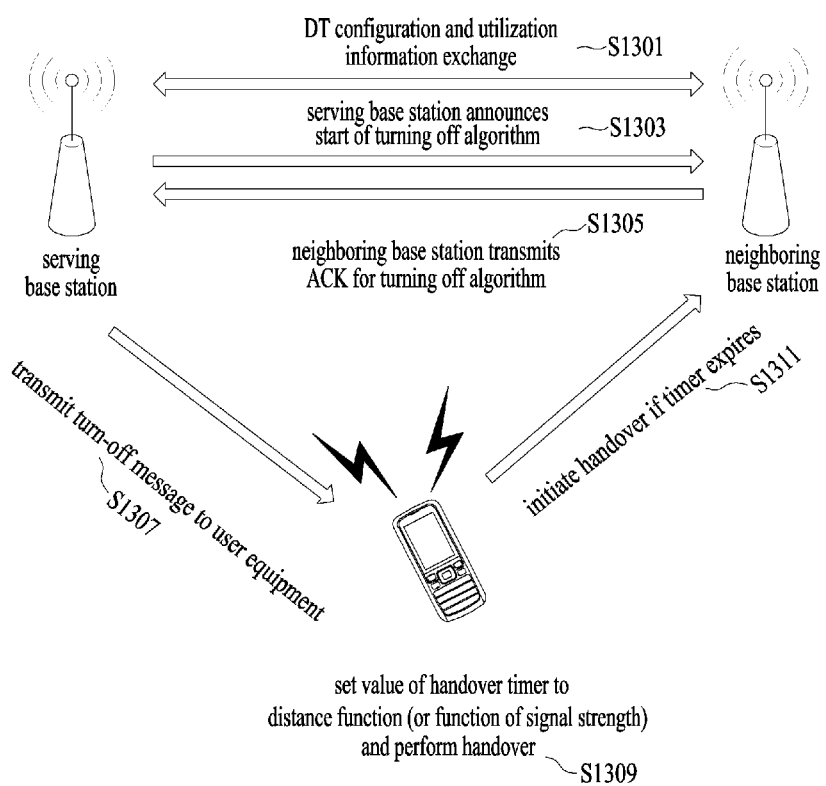
FIG. 13 is a diagram illustrating a method for determining a handover order by using a timer according to the present invention.

FIG. 13 is a diagram illustrating a method for determining a handover order by using a timer according to the present invention.

A plurality of base stations configure DT and exchange utilization information by transmitting and receiving a signal to and from one another (S1301).

After the step S1301, the serving base station notifies a neighboring base station of a message indicating that a turning off procedure of a power is performed (S1303). The neighboring base station that has received the message transmits an acknowledgement (ACK) message for the message indicating that the turning off procedure of the power is performed, to the serving base station (S1305).

The serving base station that has received the ACK message from the neighboring base station transmits a turn-off message to the user equipment (S1307). Preferably, the turn-off message is configured to be transmitted to the user equipment even in case that the turn-off message is broadcast.

The user equipment sets the value of the handover timer to a distance function in accordance with the received turned-off message (S1309). The user equipment performs handover to the neighboring base station in accordance with the set handover timer, and initiates handover if the timer expires (S1311).

If the handover order is determined using the timer, the worst case is that almost of all the user equipments are subjected to handover to the neighboring base stations but a small number of user equipments which finally remain are unable to be subjected to handover and thus power-off of the base station which will be scheduled to be turned off is failed. That is, the user equipment close to the base station which will be scheduled to be turned off is likely to be the user equipment which does not have a good channel status in view of the base station to which the user equipment will perform handover. Therefore, the user equipment which is likely to fail to perform handover to the neighboring base station is first subjected to handover (worst case first), whereby it may be determined previously whether there is any user equipment which is unable to be subjected to handover, among the user equipments connected to the base station which will be powered off. In other words, ping-pong effect may be reduced, in which the user equipments previously subjected to handover are again operated without turning off the base station due to the user equipments which remain due to handover failure after almost of all the user equipments are subjected to handover.

Therefore, in the worst case, if the user equipment connected to the base station which will be powered off fails to perform handover, the algorithm according to the embodiment of the present invention based on the timer is stopped. Spatial distribution is configured through load balancing like the status before the user equipments perform handover. Afterwards, the base stations which are turned on broadcast their utilization, and the base station having the lowest utilization performs the off operation again. However, the base station failed to be turned off broadcasts its utilization to its neighboring base station as intentionally high utilization. Therefore, the base station failed to be turned off is prevented from becoming the base station having the lowest utilization, thereby preventing from trying to perform the off operation.

FIG. 14 is a reference diagram illustrating that an off operation is failed in a timer based handover. In FIG. 14, the same algorithm as that of FIG. 6 is performed but a 'utilization broadcasting' operation is additionally performed if the off operation is failed in the timer based handover.

That is, if DT is comprised of base stations which are turned on in FIG. 14 (S1401), each of the base stations constituting DT periodically broadcasts its utilization (S1403).

Therefore, each base station may determine whether it has the smallest utilization in a cluster to which it belongs (S1405).

Each base station determines whether to perform an off algorithm (S1407). This step may be formed in the same manner as the aforementioned step S607 of FIG. 6.

Also, the base station determines whether a predetermined user equipment connected thereto is unable to perform handover (S1409). If the corresponding user equipment is unable to perform handover, the base station additionally broadcasts its utilization by reconfiguring its utilization at high level (S1411) and returns to the step S1403 to again perform the following steps.

If all the user equipments are able to perform handover, the specific base station performs the off operation and notifies another base station within n-hop of the off operation. If the off operation is completed, the base station reports the completed off operation to another base station to configure new DT (S1413).

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

A specific operation which has been herein described as being performed by the base station may be performed by an upper node of the base station as the case may be. In other words, it will be apparent that various operations performed for communication with the user equipment in the network which includes a plurality of network nodes including the base station may be performed by the base station or network nodes other than the base station. The 'base station' (BS) may be replaced with terminologies such as a fixed station, Node B, eNode B (eNB), and an access point (AP).

The embodiments according to the present invention may be implemented by various means, for example, hardware, firmware, software, or their combination. If the embodiments according to the present invention are implemented by hardware, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the embodiment of the present invention may be implemented by a type of a module, a procedure, or a function, which performs functions or operations described as above. A software code may be stored in a memory unit and then may be driven by a processor.

The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The method for supporting a self organization network (SON) for next generation to increase energy efficiency and the apparatus for the same may be applied to various wireless communication systems.

The invention claimed is:

1. A method for controlling a power in a wireless communication network, the method comprising:
enabling a first base station to transmit a broadcasting message including a utilization of the first base station;
enabling a second base station to compare its utilization with the utilization of the first base station by using the broadcasting message; and
enabling the second base station to perform a turn-off operation if the utilization of the second base station is lower than the utilization of the first base station,
wherein the first base station and the second base station form a cluster by using Delaunay triangulation, and
wherein the utilization of the first base station is determined in accordance with Equation A:

$$\int_L \rho_i(x) p_i(x) dx, \qquad \text{[Equation A]}$$

where L represents an area where the first and second base stations provide services, represents index of the first and second base stations, $\rho_i(x)$ represents system load density, and $p_i(x)$ represents user association probability.

2. The method according to claim 1, wherein the broadcasting message is transmitted periodically.

3. The method according to claim 1, wherein the second base station is located within a predetermined hop from the first base station.

4. The method according to claim 1, wherein the turn-off operation includes:
starting a turn-off algorithm if the utilization of the first base station is not higher than a predetermined threshold; and
transmitting a turn-off announcement message to the first base station.

5. The method according to claim 1, wherein the turn-off operation is performed to sequentially reduce a power level of the second base station.

6. The method according to claim 1, further comprising:
enabling the second base station to increase its utilization, broadcast the increased utilization and reconfigure its current power level to a power level prior to the performance of the turn-off operation if a user equipment connected with the second base station fails to perform handover.

7. The method according to claim 1, further comprising:
enabling the second base station to transmit a turn-off message to at least one user equipment connected with the second base station,
wherein the at least one user equipment that has received the turn-off message is configured to set a timer for handover based on a distance with the second base station.

8. The method according to claim 7, further comprising:
enabling the second base station to increase its utilization, broadcast the increased utilization and reconfigure its current power level to a power level prior to the performance of the turn-off operation if the at least one user equipment fails to perform handover.

9. The method according to claim 1, further comprising transmitting a turn-on message to a third base station if the first base station has a threshold higher than a predetermined upper threshold.

10. A first base station for performing power control in a wireless communication system, the first base station comprising:
a radio frequency (RF) unit; and
a processor,
wherein the processor is configured to:
control the RF unit to receive a broadcasting message including a utilization of a second base station from the second base station,
compare a utilization of the first base station with the utilization of the second base station by using the received broadcasting message, and
perform a turn-off operation if the utilization of the second base station is lower than the utilization of the first base station,
wherein the first base station and the second base station form a cluster by using Delaunay triangulation, and
wherein the utilization of the first base station is determined in accordance with Equation A:

$$\int_L \rho_i(x) p_i(x) dx, \quad \text{[Equation A]}$$

where L represents an area where the first and second base stations provide services, i represents index of the first and second base stations, $\rho_i(x)$ represents system load density, and $p_i(x)$ represents user association probability.

* * * * *